US012222679B1

(12) United States Patent
Xie et al.

(10) Patent No.: US 12,222,679 B1
(45) Date of Patent: Feb. 11, 2025

(54) HOLOGRAPHIC WAVEFRONT PRINTING SYSTEM AND METHOD

(71) Applicant: HUAZHONG UNIVERSITY OF SCIENCE AND TECHNOLOGY, Hubei (CN)

(72) Inventors: Xiaolin Xie, Hubei (CN); Jinlun Zhou, Hubei (CN); Haiyan Peng, Hubei (CN); Yun Zhang, Hubei (CN); Huamin Zhou, Hubei (CN); Mingli Ni, Hubei (CN); Xingping Zhou, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/713,188

(22) PCT Filed: Oct. 26, 2022

(86) PCT No.: PCT/CN2022/127549
§ 371 (c)(1),
(2) Date: May 24, 2024

(87) PCT Pub. No.: WO2023/202020
PCT Pub. Date: Oct. 26, 2023

(30) Foreign Application Priority Data

Apr. 19, 2022 (CN) .......................... 202210409324.5

(51) Int. Cl.
*G03H 1/02* (2006.01)
*G03H 1/04* (2006.01)
(Continued)

(52) U.S. Cl.
CPC ......... *G03H 1/0476* (2013.01); *G03H 1/0443* (2013.01); *G03H 1/16* (2013.01);
(Continued)

(58) Field of Classification Search
CPC ...... G03H 1/0476; G03H 1/0443; G03H 1/16; G03H 1/30; G03H 2001/045; G03H 2001/0482
(Continued)

(56) References Cited

U.S. PATENT DOCUMENTS

2005/0134948 A1* 6/2005 Waldman ............... G03H 1/265
2021/0191318 A1* 6/2021 Kick ........................ G03H 1/26
2021/0389724 A1* 12/2021 Cossairt ............... G03H 1/2286

FOREIGN PATENT DOCUMENTS

CN          107253400          10/2017

OTHER PUBLICATIONS

"Written Opinion of the International Searching Authority (Form PCT/ISA/237) of PCT/CN2022/127549," mailed on Dec. 16, 2022, pp. 1-4.

(Continued)

*Primary Examiner* — Audrey Y Chang
(74) *Attorney, Agent, or Firm* — JCIPRNET (57) ABSTRACT

A holographic wavefront printing system and method are provided. A two-dimension digital blazed grating is loaded on a phase hologram, and the emergent direction of active region diffracted light is adjusted to prevent overlapping with the dead region diffracted light after being Fourier transformed by a lens, and a phase spatial light modulator is inclined by a preset angle to change the emergent direction of the diffracted light, such that the dead region zeroth-order and first-order diffracted light on a focusing surface are symmetrical with respect to a main optical axis of a first lens, the frequency spectrum center of active region zeroth-order diffracted light is then loaded to the original frequency spectrum center without information change. In this way, the adverse effects of the dead region diffracted light and active
(Continued)

region high-order diffracted light of the phase spatial light modulator on holographic wavefront printing are eliminated.

10 Claims, 9 Drawing Sheets

(51) Int. Cl.
  *G03H 1/16* (2006.01)
  *G03H 1/30* (2006.01)
(52) U.S. Cl.
  CPC ......... *G03H 1/30* (2013.01); *G03H 2001/045* (2013.01); *G03H 2001/0482* (2013.01)
(58) Field of Classification Search
  USPC ..................................................... 359/10, 11
  See application file for complete search history.

(56) References Cited

OTHER PUBLICATIONS

"International Search Report (Form PCT/ISA/210) of PCT/CN2022/127549," mailed on Dec. 16, 2022, with English translation thereof, pp. 1-5.

* cited by examiner

HOLOGRAPHIC WAVEFRONT PRINTING SYSTEM AND METHOD

CROSS-REFERENCE TO RELATED APPLICATION

This application is a 371 of international application of PCT application serial no. PCT/CN2022/127549, filed on Oct. 26, 2022, which claims the priority benefits of China application no. 202210409324.5, filed on Apr. 19, 2022. The entirety of each of the above-mentioned patent applications is hereby incorporated by reference herein and made a part of this specification.

FIELD OF THE DISCLOSURE

The disclosure belongs to the technical field of holographic printing, and more specifically, relates to a holographic wavefront printing system and method.

DESCRIPTION OF RELATED ART

Holographic printing technology may be utilized to produce large-format, large-viewing-angle holograms. Currently, there are three related methods: computational holographic printing, stereoscopic synthetic holographic printing (also called light field printing) and holographic wavefront printing. The computational holographic printing system adopts laser direct writing to achieve printing. Such system does not have high requirements for vibration resistance, but requires precise focusing of the imaging lens and is unable to produce volume holograms that can be reproduced with white light. Stereoscopic synthetic holographic printing does not require complex diffraction calculations, but requires the system to have high vibration resistance, and is unable to record and reproduce complete information about the object. The reconstructed image will become blurry when the depth is deep. Holographic wavefront printing is able to record and reproduce the complete information of the object, produce a volume hologram that can be reproduced with white light, and has a better holographic presentation effect, so holographic wavefront printing has received much more attention.

The principle of holographic wavefront printing is to divide a computer-generated hologram into a set of sub-holograms, and then load the set of sub-holograms onto the spatial light modulator in sequence. After laser illumination and diffraction, the wavefront of the hologram is obtained, and finally the wavefront is used as the object light for the interference with the reference light, and a volume hologram is printed on the holographic recording material. Each sub-hologram recorded on the holographic recording material is called a hogel. The size S' of the holographic element and the field of view angle θ, satisfy the mathematical relationship of $S' \times \theta_v = \lambda \times N$, wherein λ is the laser wavelength, and N is the pixel of the hologram.

Holographic wavefront printing uses two types of spatial light modulators, including amplitude spatial light modulators and phase spatial light modulators, depending on the loaded computational hologram. The most common one is the holographic wavefront printing system using amplitude spatial light modulator. When calculating the amplitude hologram, it is necessary to introduce the plane reference light to interfere with the object light, and the conjugate image and the original object image will be generated simultaneously during reconstruction. Therefore, holographic wavefront printing systems using amplitude spatial light modulators require filtering to remove the influence of conjugate images, resulting in reduced spatial bandwidth products and lower energy utilization. The calculation of phase hologram does not require the introduction of reference light for interference. During reconstruction, there is only a single reconstructed image in the optical axis direction, which is not affected by the conjugate image, and therefore there are high spatial bandwidth product and energy utilization. In the meantime, for amplitude information and phase information of the same magnitude, phase information is able to reconstruct an image with higher quality. In addition, since the phase may be directly modulated, the holographic wavefront printing system using the phase spatial light modulator is not only able to print large-format, white-light reproducible volume holograms, but also able to produce functional holographic optical elements (HOE).

However, due to the discrete characteristics brought about by the pixelated structure of the phase spatial light modulator, when the phase spatial light modulator is illuminated by a plane wave, multi-order diffracted light is generated in the horizontal and vertical directions, which interferes with the printing process of the hologram and has an adverse effect on the printing quality of the hologram. Due to the adverse effects, the practical application of phase spatial light modulators in holographic wavefront printing is limited.

SUMMARY OF THE DISCLOSURE

In view of the shortcomings of the existing technology, the purpose of the present disclosure is to provide a holographic wavefront printing system and method, aiming to suppress the discrete characteristics caused by the pixelated structure of the phase spatial light modulator and eliminate the adverse effect of the dead region diffracted light and active region high-order diffracted light of the phase spatial light modulator on holographic wavefront printing, thereby overcoming the difficulty of practically applying phase spatial light modulators in holographic wavefront printing.

In order to achieve the above purpose, the first aspect of the present disclosure provides a holographic wavefront printing system, including: a laser, a phase spatial light modulator, a first lens, a second lens, a low-pass filter and a holographic recording material;

The laser is configured to generate a laser light, and the laser light is divided into two light beams, namely an object light and a reference light;

The phase spatial light modulator is configured to load a phase hologram. The pixel structure of the phase spatial light modulator includes an active region and a dead region. The active region is configured to load the phase hologram to modulate the phase of the incident light, thereby generating the active region diffracted light containing the phase information of the object. The dead region causes a constant phase shift of the incident light, producing dead region diffracted light. A two-dimensional digital blazed grating is loaded on the phase hologram to adjust the emergent direction of the active region diffracted light, such that corresponding frequency spectra of the active region diffracted light and dead region diffracted light after being subjected to an optical Fourier transform of a lens are prevented from overlapping with each other on a back focusing surface of the lens;

The object light is incident on the phase spatial light modulator and emits corresponding diffracted light. The diffracted light includes active region diffracted light and dead region diffracted light. The diffracted light is incident on the first lens and emitted onto the back focusing surface of the first lens after being subjected to an optical Fourier transform of the first lens. The phase spatial light modulator is inclined by a preset angle to change the emergent direction of the diffracted light, such that a dead region zeroth-order diffracted light frequency spectrum center and a dead region first-order diffracted light frequency spectrum center on a focusing surface are symmetrical with respect to a main optical axis of the first lens, and the active region zeroth-order diffracted light frequency spectrum center is adjusted to an original frequency spectrum center. The original frequency spectrum center refers to the position of the active region zeroth-order diffracted light frequency spectrum center on the back focusing surface of the first lens when the two-dimensional digital blazed grating is not loaded and the phase spatial light modulator is not inclined;

The low-pass filter is placed on the back focusing surface of the first lens, and configured to filter the dead region diffracted light and the active region high-order diffracted light, and only allows the active region zeroth-order diffracted light to pass through. The second lens is placed on the emergent direction of the low-pass filter, and configured to perform the optical Fourier inverse transform on the emitted active region zeroth-order diffracted light to obtain the object light containing effective information of the phase hologram. The object light containing the effective information of the phase hologram and the reference light are incident onto the holographic recording material, interference is generated in the holographic recording material, and a volume hologram is generated to complete the holographic wavefront printing process.

In an optional example, the two-dimensional digital blazed grating is loaded on the phase hologram to adjust the emergent direction of the active region diffracted light, which is specifically performed as follows:

The two-dimensional digital blazed grating adjusts the emergent direction of the active region diffracted light, such that the corresponding frequency spectrum of the active region diffracted light after being subjected to the optical Fourier transform of the lens moves by $\lambda f_1/2\Delta p$ relatively; wherein $\lambda$ is the laser wavelength, $\Delta p$ is the pixel pitch of the phase spatial light modulator, and $f_1$ is the focal length of the first lens.

In an optional example, the preset angle $\theta_s$ at which the phase spatial light modulator is inclined and the diffraction angle $\theta_d$ of the dead region of the phase spatial light modulator should satisfy the following relationship: $\theta_d=2\theta_s$; wherein $\theta_d$ is the angle between the dead region zeroth-order diffracted light and the dead region first-order diffracted light.

In an optional example, the inclining direction of the phase spatial light modulator is opposite to the moving direction of the active region diffracted light frequency spectrum after being loaded with the two-dimensional digital blazed grating.

In an optional example, the low-pass filter is a square aperture, and a side thereof is L; wherein $L \leq f_1 \tan \theta_d$.

In an optional example, the system further includes: an electronically controlled translation platform;

The electronically controlled translation platform is configured to carry the holographic recording materials;

When the area of the phase hologram to be loaded exceeds the threshold, the phase hologram is divided into a plurality of sub-phase holograms, each of the sub-phase holograms is loaded onto the phase spatial light modulator in turn, and combined with the electronically controlled translation platform to move the holographic recording material according to the region corresponding to each of the sub-phase holograms, such that the phase holograms are printed into various regions of the holographic recording material in batches and region by region to form a large hologram.

In an optional example, the system further includes: a CCD camera;

The CCD camera is equipped with a telecentric lens for observing whether the light spot of the object light containing effective information of the phase hologram and the light spot of the reference light on the holographic recording material overlap each other, so as to assist in adjusting the light spots of the object light and the reference light to overlap each other.

A second aspect of the present disclosure provides a holographic wavefront printing method, which includes the following steps:

The laser light is generated and the laser light is divided into two light beams, namely the object light and the reference light;

The phase spatial light modulator is configured to load a phase hologram. The pixel structure of the phase spatial light modulator includes an active region and a dead region. The active region is configured to load the phase hologram to modulate the phase of the incident light, thereby generating the active region diffracted light containing the phase information of the object. The dead region will cause a constant phase shift of the incident light, producing dead region diffracted light. A two-dimensional digital blazed grating is loaded on the phase hologram to adjust the emergent direction of the active region diffracted light, such that corresponding frequency spectra of the active region diffracted light and dead region diffracted light after being subjected to an optical Fourier transform of a lens are prevented from overlapping with each other on a back focusing surface of the lens;

The object light is incident on the phase spatial light modulator and emits corresponding diffracted light from the phase spatial light modulator. The diffracted light includes active region diffracted light and dead region diffracted light;

The diffracted light is incident on the first lens and emitted onto the back focusing surface of the first lens after being subjected to an optical Fourier transform of the first lens. The phase spatial light modulator is inclined by a preset angle to change the emergent direction of the diffracted light, such that a dead region zeroth-order diffracted light frequency spectrum center and a dead region first-order diffracted light frequency spectrum center on a focusing surface are symmetrical with respect to a main optical axis of the first lens, and the active region zeroth-order diffracted light frequency spectrum center is adjusted to an original frequency spectrum center. The original frequency spectrum center refers to the position of the active region zeroth-order diffracted light frequency spectrum center on the back focusing surface of the first lens when the two-dimensional digital blazed grating is not loaded and the phase spatial light modulator is not inclined;

The low-pass filter is placed on the back focusing surface of the first lens, and configured to filter the dead region diffracted light and the active region high-order diffracted light, and only allows the active region zeroth-order diffracted light to pass through;

The second lens is placed on the emergent direction of the low-pass filter, and configured to perform the optical Fourier inverse transform on the emitted active region zeroth-order diffracted light to obtain the object light containing effective information of the phase hologram;

The object light containing the effective information of the phase hologram and the reference light are incident onto the holographic recording material, interference is generated in the holographic recording material, and a volume hologram is generated to complete the holographic wavefront printing process.

In an optional example, the two-dimensional digital blazed grating is loaded on the phase hologram to adjust the emergent direction of the active region diffracted light, which is specifically performed as follows:

The two-dimensional digital blazed grating adjusts the emergent direction of the active region diffracted light, such that the corresponding frequency spectrum of the active region diffracted light after being subjected to the optical Fourier transform of the lens moves by $\Delta f_1/2\Delta p$ relatively; wherein $\lambda$ is the laser wavelength, $\Delta p$ is the pixel pitch of the phase spatial light modulator, and $f_1$ is the focal length of the first lens.

In an optional example, the preset angle $\theta_s$ at which the phase spatial light modulator is inclined and the diffraction angle $\theta_d$ of the dead region of the phase spatial light modulator should satisfy the following relationship: $\theta_d=2\theta_s$; wherein $\theta_d$ is the angle between the dead region zeroth-order diffracted light and the dead region first-order diffracted light.

Generally speaking, compared with the related art, the above technical solution conceived by the present disclosure has the following advantageous effects:

The present disclosure provides a holographic wavefront printing system and method. A two-dimension digital blazed grating is loaded on a phase hologram, and the emergent direction of active region diffracted light is adjusted, such that corresponding frequency spectra of the active region diffracted light and the dead region diffracted light after being subjected to an optical Fourier transform of a lens are prevented from overlapping with each other on a back focusing surface of the lens, and a phase spatial light modulator is inclined by a preset angle to change the emergent direction of the diffracted light, such that a dead region zeroth-order diffracted light frequency spectrum center and a dead region first-order diffracted light frequency spectrum center on a focusing surface are symmetrical with respect to a main optical axis of a first lens, the active region zeroth-order diffracted light frequency spectrum center after the two-dimensional digital blazed grating is loaded is adjusted to an original frequency spectrum center, and information which is stored in the holographic recording material is thus not changed. In this way, the whole printing process is simpler, more convenient and more reliable. The technical features of the present disclosure suppress the discrete characteristics caused by the pixelated structure of the phase spatial light modulator, thereby eliminating the adverse effect of the dead region diffracted light and the active region high-order diffracted light of the phase spatial light modulator on holographic wavefront printing, and thus overcoming the difficulty of practically applying phase spatial light modulators in holographic wavefront printing.

The present disclosure provides a holographic wavefront printing system and method. Compared with the existing solution using a band-pass filter, the present disclosure adopts a low-pass filter to avoid the central dot of the band-pass filter from blocking the low-frequency part of the active region diffracted light field, thereby preventing the partial useful information in the printed hologram from losing. The present disclosure adopts the two-dimensional digital blazed grating, the phase spatial light modulator and the low-pass filter to ensure printing quality, printing reliability, as well as high spatial bandwidth and energy utilization. In this way, not only that it is possible to print a large-size, white-light reproducible volume hologram, it is also possible to produce functional HOEs, so that the application fields of holographic wavefront printing may be significantly expanded.

DESCRIPTION OF EMBODIMENTS

In order to make the purpose, technical solutions and advantages of the present disclosure more clear, the present disclosure will be further described in detail below with reference to the accompanying drawings and embodiments. It should be understood that the specific embodiments described here are only used to explain the present disclosure and are not intended to limit the present disclosure.

Figure 1:
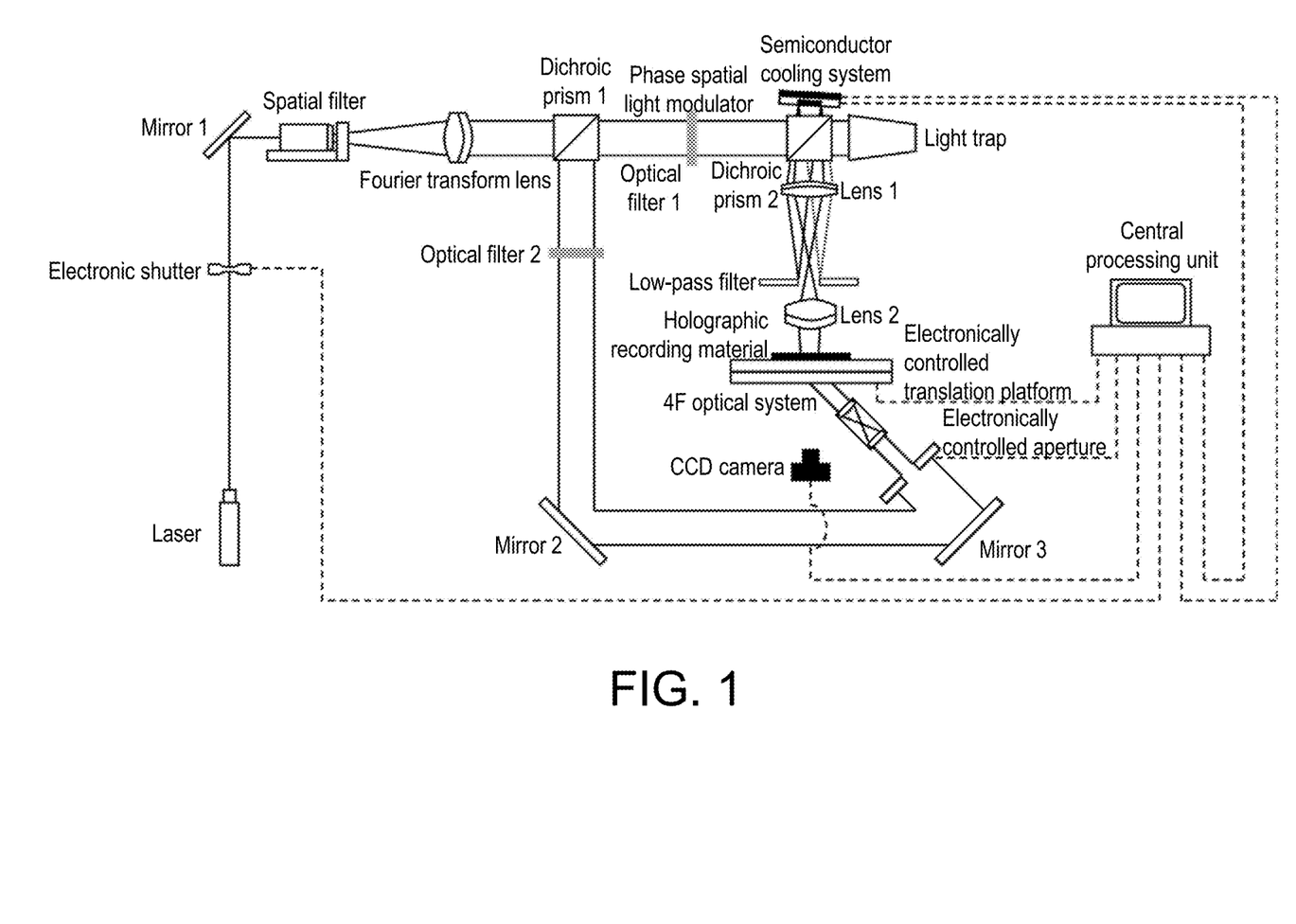
FIG. 1 is a schematic structural view of a holographic wavefront printing system provided by an embodiment of the present disclosure.

The disclosure belongs to the technical field of holographic printing, and specifically discloses a holographic wavefront printing system. FIG. 1 is a schematic structural view of a holographic wavefront printing system provided by an embodiment of the present disclosure. As shown in FIG. 1, the holographic wavefront printing system includes a laser, an electronic shutter, a mirror, a spatial filter, a Fourier transform lens, a dichroic prism, an optical filter, a phase spatial light modulator, a semiconductor cooling system, a light trap, a lens, a low-pass filter, a holographic recording material, an electronically controlled translation platform, a 4F optical system, a CCD camera, an electronically controlled aperture, and a central processing unit. The holographic wavefront printing system emits linearly polarized light of a single wavelength through the laser, and the linearly polarized light is split into two beams by the dichroic prism after being expanded and collimated by the spatial filter and the lens. One light beam is modulated by the phase spatial light modulator and filtered and zoomed by the telecentric imaging objective lens system composed of the lens 1, the band-pass filter, and the lens 2 as an object light; and the other light beam is zoomed and filtered by the electronically controlled aperture and the 4F optical system and used as the reference light. The object light and the reference light interfere on the holographic recording material to print the holographic element. The central processing unit controls the phase spatial light modulator to load the sub-hologram, controls the electronic shutter to expose, controls the electronically controlled translation platform to move, and eliminates vibration statically; the above steps are repeated to tile and print the hologram on the holographic recording material. The CCD camera is able to display the focusing position of the object light and the reference light on the holographic recording material, and assist in adjusting the overlap of the object light and the reference light. The optical filter 1 and optical filter 2 are configured to adjust the intensity of the object light and reference light respectively. The mirror is configured to adjust the direction of light. The light trap is configured to absorb unwanted light beams.

The purpose of the present disclosure is to suppress the discrete characteristics caused by the pixelated structure of the phase spatial light modulator and eliminate the adverse effects of the dead region diffracted light and the active region high-order diffracted light of the phase spatial light modulator on holographic wavefront printing, thereby overcoming the difficulty of practically applying phase spatial light modulators in holographic wavefront printing.

In order to achieve the above purpose, the first aspect of the present disclosure provides a holographic wavefront printing system, including: a laser, a phase spatial light modulator, a first lens, a second lens, a low-pass filter and a holographic recording material;

The laser is configured to generate laser light, and the laser light is divided into two light beams, namely object light and reference light;

The phase spatial light modulator is configured to load a phase hologram. The pixel structure of the phase spatial light modulator includes an active region and a dead region. The active region is configured to load the phase hologram to modulate the phase of the incident light, thereby generating the active region diffracted light containing the phase information of the object. The dead region will cause a constant phase shift of the incident light, producing dead region diffracted light. A two-dimensional digital blazed grating is loaded on the phase hologram to adjust the emergent direction of the active region diffracted light, such that corresponding frequency spectra of the active region diffracted light and dead region diffracted light after being subjected to an optical Fourier transform of a lens are prevented from overlapping with each other on a back focusing surface of the lens;

The object light is incident on the phase spatial light modulator and emits corresponding diffracted light. The diffracted light includes active region diffracted light and dead region diffracted light. The diffracted light is incident on the first lens and emitted onto the back focusing surface of the first lens after being subjected to an optical Fourier transform of the first lens. The phase spatial light modulator is inclined by a preset angle to change the emergent direction of the diffracted light, such that a dead region zeroth-order diffracted light frequency spectrum center and a dead region first-order diffracted light frequency spectrum center on a focusing surface are symmetrical with respect to a main optical axis of the first lens, and the active region zeroth-order diffracted light frequency spectrum center is adjusted to an original frequency spectrum center. The original frequency spectrum center refers to the position of the active region zeroth-order diffracted light frequency spectrum center on the back focusing surface of the first lens when the two-dimensional digital blazed grating is not loaded and the phase spatial light modulator is not inclined;

The low-pass filter is placed on the back focusing surface of the first lens, and configured to filter the dead region diffracted light and the active region high-order diffracted light, and only allows the active region zeroth-order diffracted light to pass through. The second lens is placed on the emergent direction of the low-pass filter, and configured to perform the optical Fourier inverse transform on the emitted active region zeroth-order diffracted light to obtain the object light containing effective information of the phase hologram. The object light containing the effective information of the phase hologram and the reference light are incident onto the holographic recording material, interference is generated in the holographic recording material, and a volume hologram is generated to complete the holographic wavefront printing process.

In an optional example, the two-dimensional digital blazed grating is loaded on the phase hologram to adjust the emergent direction of the active region diffracted light, which is specifically performed as follows:

The two-dimensional digital blazed grating adjusts the emergent direction of the active region diffracted light, such that the corresponding frequency spectrum of the active region diffracted light after being subjected to the optical Fourier transform of the lens moves by $\lambda f_1/2\Delta p$ relatively; wherein $\lambda$ is the laser wavelength, $\Delta p$ is the pixel pitch of the phase spatial light modulator, and $f_1$ is the focal length of the first lens.

In an optional example, the preset angle $\theta_s$ at which the phase spatial light modulator is inclined and the diffraction angle $\theta_d$ of the dead region of the phase spatial light modulator should satisfy the following relationship: $\theta_d=2\theta_s$; wherein $\theta_d$ is the angle between the dead region zeroth-order diffracted light and the dead region first-order diffracted light.

In an optional example, the inclining direction of the phase spatial light modulator is opposite to the moving direction of the active region diffracted light frequency spectrum after being loaded with the two-dimensional digital blazed grating.

In an optional example, the low-pass filter is a square aperture, and a side thereof is L; wherein $L \leq f_1 \tan \theta_d$.

It should be noted that the silicon-based liquid crystal phase spatial light modulator has the advantages of high aperture ratio, light efficiency and resolution. In the meantime, the calculation of the phase hologram does not require the introduction of interference of the reference light. During reconstruction, there is only a single reconstructed image in the optical axis direction, which is not affected by the conjugate image, and has high spatial bandwidth product and energy utilization. However, due to the discrete characteristics brought about by the pixelated structure of the phase spatial light modulator, when being illuminated by a plane wave, multi-order diffracted light is generated in the transverse and longitudinal directions, which interferes with the printing process of the hologram. Therefore, the practical application of the phase spatial light modulator is limited.

Figure 2:
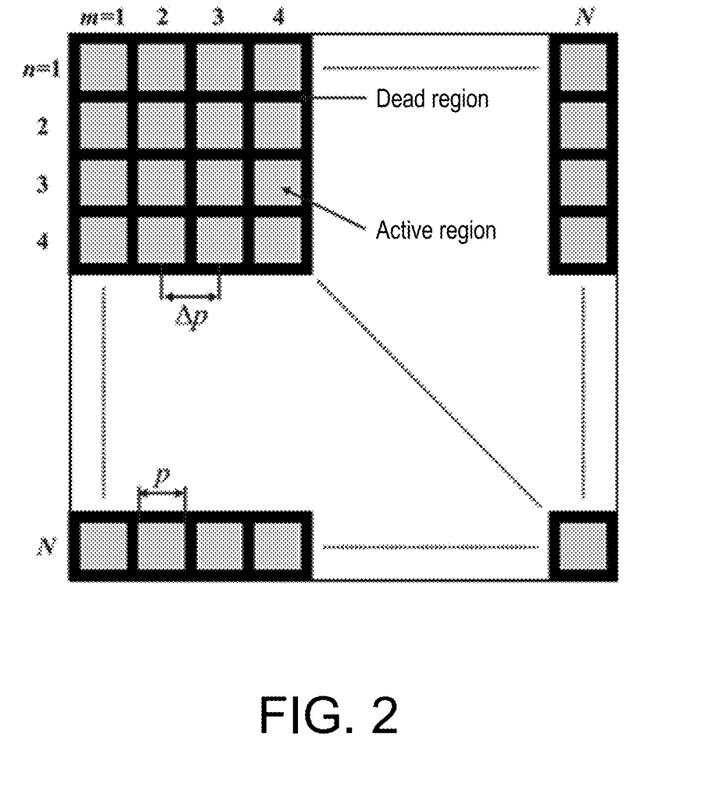
FIG. 2 is a schematic view of a pixelated structure of a phase spatial light modulator provided by an embodiment of the present disclosure.

FIG. 2 shows a schematic view of a pixel structure of a phase spatial light modulator with N×N pixels, wherein p is a pixel side length and $\Delta p$ is a pixel pitch. The phase spatial light modulator consists of an active region and a dead region. The active region is able to load a hologram to modulate the phase of the incident light wave. The dead region is the "black grating" around the active region, which causes a constant phase shift of the incident light wave. Since the display area of the phase spatial light modulator is limited, the incident light wave will also be modulated by an aperture function a(x,y) ((x,y) is the coordinate of the phase spatial light modulator plane), the modulation on the plane incident light wave by the phase spatial light modulator may be expressed as:

$$t(x,y)=a(x,y)[t_1(x,y)+t_2(x,y)].$$

Additionally, $$a(x, y) = rect\left(\frac{x}{N\Delta p}, \frac{y}{N\Delta p}\right),$$

$$t_1(x, y) = rect\left(\frac{x}{p}, \frac{y}{p}\right) \otimes \left\{\exp[i\varphi(x, y)] \sum_{m,n=0}^{N-1} \delta(x - m\Delta p, y - n\Delta p)\right\},$$

$$t_2(x, y) =$$

$$\left[rect\left(\frac{x}{\Delta p}, \frac{y}{\Delta p}\right) - rect\left(\frac{x}{y}, \frac{y}{p}\right)\right] \otimes \left[\exp(i\varphi_0) \sum_{m,n=0}^{N-1} \delta(x - m\Delta p, y - n\Delta p)\right].$$

In the above equations, $t_1(x,y)$ is the modulation on the plane incident light wave by the active region, $t_2(x,y)$ is the modulation on the plane incident light wave by the dead region, $\varphi(x,y)$ is the phase distribution of the hologram loaded in the active region, $\varphi_0$ is the constant phase shift caused by the dead region, $\otimes$ is the convolution operation, $\delta$ is the impulse function, and m and n are the pixel coordinates of the phase spatial light modulator in the horizontal and vertical directions respectively.

It can be seen from the above equation that due to the discrete characteristics brought about by the pixelated structure of the phase spatial light modulator, the plane incident light wave will be modulated to generate a dead-region-modulated DC term, an active-region-modulated object light wave, and replicated multi-order diffracted light thereof along the transverse and longitudinal directions. The dead region may be regarded as a grating with a fringe spacing of $\Delta p$ in both transverse and longitudinal directions. Therefore, the diffraction angle $\theta_d$ of the dead region along the x-axis and y-axis may be given by the following equation:

$$\theta_d = \sin^{-1}\left(\frac{k\lambda}{\Delta p}\right).$$

In the equation, k is the diffraction order of the dead region, and $\lambda$ is the laser wavelength. The hologram loaded in the active region may be regarded as a local grating. The minimum fringe spacing of the local gratings is $2\Delta p$, so the maximum diffraction angle $\theta_a$ of the active region may be given through the following equation:

$$\theta_a = \sin^{-1}\left(\frac{l\lambda}{2\Delta p}\right).$$

In the equation, l is the diffraction order of the active region. It can be seen from the above equation that high-order diffracted light has a larger diffraction angle and therefore has a higher spatial frequency.

The high-order diffracted light in the dead region diffracted light field and the active region diffracted light field generated by the phase spatial light modulator after modulating the plane incident light wave interferes with the hologram printing process. The key to solving the above problems is to effectively distinguish between useful object light waves and useless DC terms as well as the high-order diffracted light thereof, and remove the useless parts. Since high-order diffracted light has a higher spatial frequency, the optical Fourier transform effect of the lens is utilized to separate the diffracted light field of the phase spatial light modulator on the frequency spectrum plane.

The present disclosure first adopts a method of filtering in the frequency spectrum plane to suppress the discrete characteristics of the phase spatial light modulator. By using the telecentric optical system shown in FIG. 3A and FIG. 3B, the phase spatial light modulator is located on the front focal plane of the lens 1, the holographic recording material is located on the back focal plane of the lens 2, the back focal plane of the lens 1 coincides with the front focal plane of the lens 2, and the band-pass filter is located on the overlapping plane. The system uses the lens 1 to obtain the optical Fourier transform of the diffracted light field of the phase spatial light modulator on the back focal plane thereof, and modifies the frequency spectrum by inserting a suitable band-pass filter on the back focal plane of the lens 1, and finally uses the lens 2 to perform optical Fourier inverse transform to obtain the object light wave required for printing.

Figure 4:
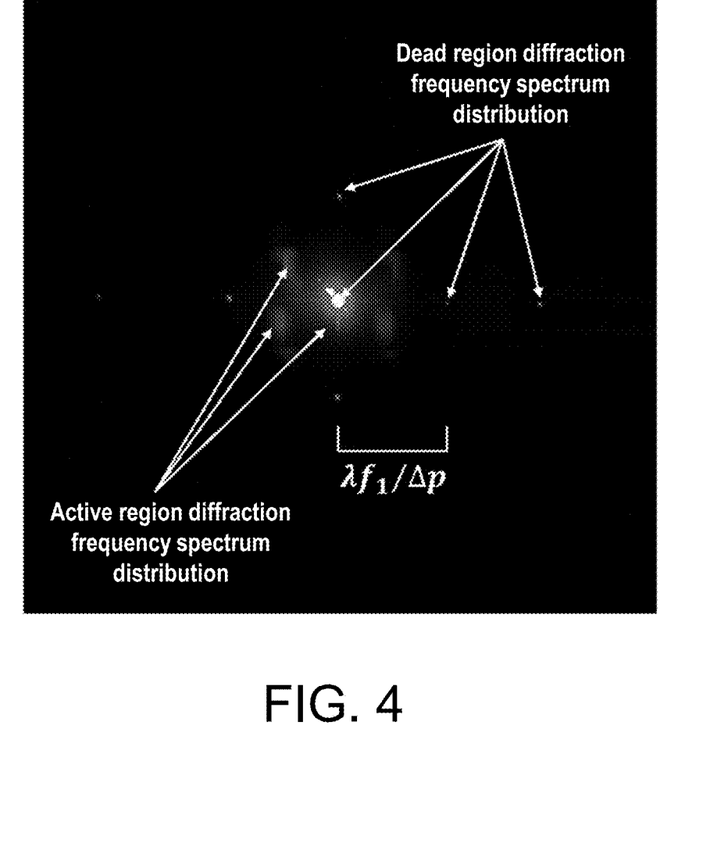
FIG. 4 is a schematic view of a frequency spectrum distribution of a diffraction light field of the phase spatial light modulator provided by an embodiment of the present disclosure.

FIG. 4 shows the frequency spectrum distribution of the diffraction light field of the phase spatial light modulator during the experiment. Since the modulation characteristics on the plane incident light wave at various positions in the dead region are the same, various positions of the diffraction light field of each order of the dead region have the same spatial frequency. Through the optical Fourier transform of the lens 1, the diffracted light field of the same order will converge into a point on the back focal plane of the lens 1, so the frequency spectrum distribution of the dead region diffracted light field is a lattice with $\Delta f_1/\Delta p$ as intervals. The modulation characteristics of the active region on the plane incident light wave are related to the gray value of the hologram loaded at various positions. However, due to the limitation of the maximum diffraction angle $\theta_a$ of each order of the active region diffracted light field, the frequency spectrum distribution of the active region diffracted light field is a square array with the lattice of the dead region diffracted light field frequency spectrum distribution as the center and with $\Delta f_1/\Delta p$ as the side length. High diffraction orders have greater spatial frequencies and therefore the frequency spectrum distribution is further from the optical axis. Based on the above, the frequency spectrum distribution of the diffraction light field of the phase spatial light modulator may be modified by using a band-pass filter composed of a square aperture with a dot in the center on the back focal plane of the lens 1, so that only the light waves with a specific spatial frequency are allowed to pass through, thereby suppressing the high-order diffracted light in the dead region diffracted light field and the active region diffracted light field.

Figure 3A:
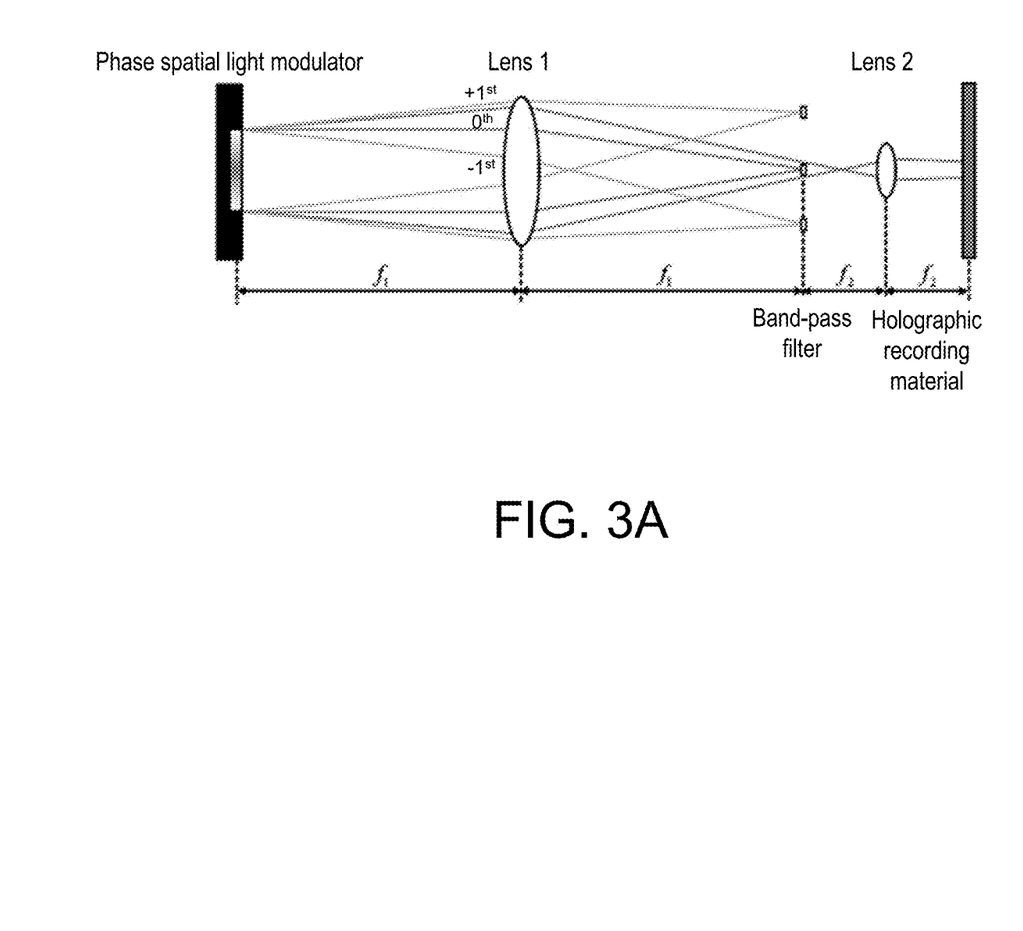
FIG. 3A and FIG. 3B are structural views of a telecentric optical system using a band-pass filter provided by an embodiment of the present disclosure.
Figure 3B:
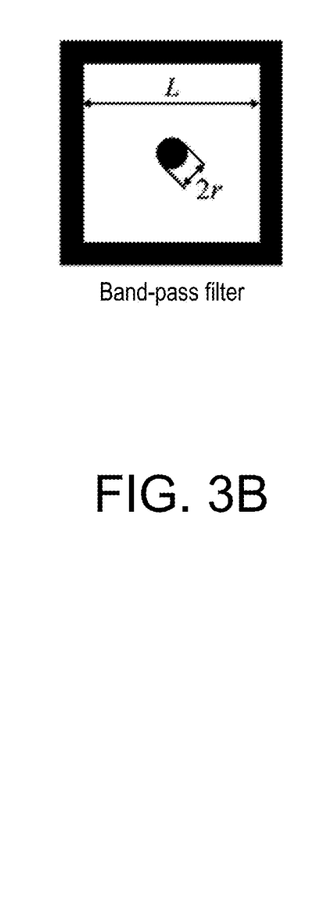
Figure 5:
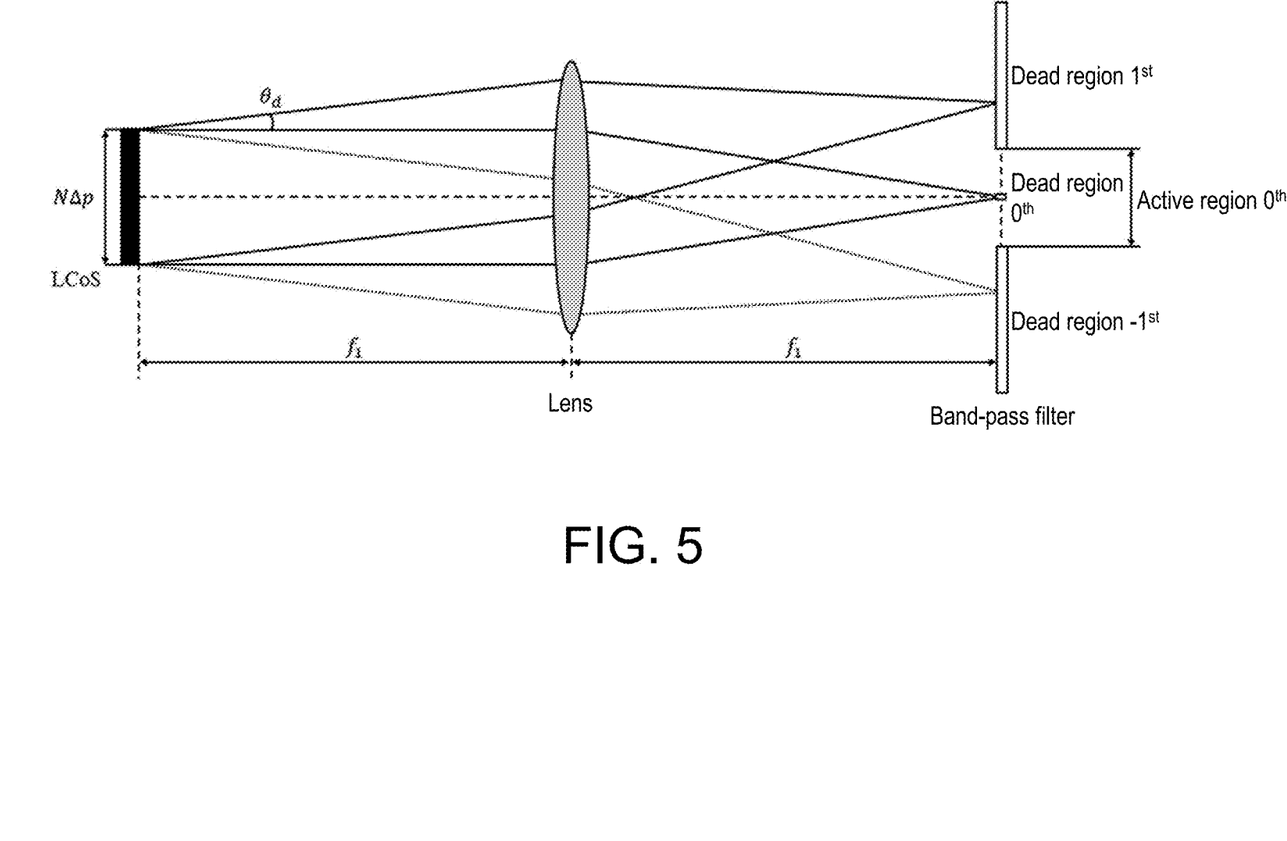
FIG. 5 is a structural view of the telecentric optical system when the phase hologram provided by an embodiment of the present disclosure is not loaded with a two-dimensional digital blazed grating and the phase spatial light modulator is not inclined.

However, the filtering method shown in FIG. 3A and FIG. 3B above still has some problems. Since the frequency spectrum distribution of the active region diffracted light field of the phase spatial light modulator is centered on the lattice of the frequency spectrum distribution of the dead region diffracted light field, each of their diffraction orders coincides at the center of the square array. FIG. 5 shows a detailed demonstration of the principle of using a band-pass filter to suppress the discrete characteristics of a phase spatial light modulator, wherein the phase hologram is not loaded with the two-dimensional digital blazed grating and the phase spatial light modulator is not inclined. FIG. 5 is a structural view of the corresponding telecentric optical system. It can be seen that although the filtering method using a band-pass filter suppresses the impact of high diffraction orders on hologram printing, the central dot of the band-pass filter blocks the low-frequency part of the active region diffracted light field, resulting in black spots occurred at certain angles in the reconstruction of the printed hologram, that is, partial useful information is lost, which dramatically affects the printing quality of the hologram.

In order to optimize the above filtering method, it is necessary to separate the frequency spectrum of the active region diffracted light field from the frequency spectrum of the dead region diffracted light field, that is, the two-dimensional digital blazed grating is loaded on each sub-hologram. The two-dimensional digital blazed grating generally modulates the phase of light waves with a period of $2\pi$, which is mainly used to readjust the diffraction direction of light, and the mathematical expression thereof is:

$$\varphi_r(m, n) = \frac{2\pi}{T}\mathrm{mod}(bm + cn).$$

In the equation, m and n are the pixel coordinates of the phase spatial light modulator in the horizontal and vertical directions respectively, and $-N/2 \le m \le N/2-1$, $-N/2 \le n \le N/2-1$; T is the period of the two-dimensional digital blazed grating, and taken as a positive integer greater than or equal to 2. By taking different values for b and c, two-dimensional digital blazed gratings in the horizontal and vertical directions may be obtained respectively. Two-dimensional digital blazed gratings with different blaze angles may be obtained by taking different values for T.

Two-dimensional digital blazed grating is mainly configured to readjust the diffraction direction of light, which is equivalent to moving the energy of light. Before loading the two-dimensional digital blazed grating, the frequency spectrum of the active region diffracted light field of the phase spatial light modulator is a square array with the frequency spectrum of the dead region diffracted light field as the center and with $\Delta f_1/\Delta p$ as the side length. When a two-dimensional digital blazed grating with a fringe spacing $2\Delta p$ in the x-direction or y-direction is loaded, the object light will be offset along the x-direction or y-direction, and the offset angle $\theta_g$ satisfies the following equation:

$$\theta_g = \sin^{-1}\left(\frac{k\lambda}{2\Delta p}\right).$$

Figure 6:
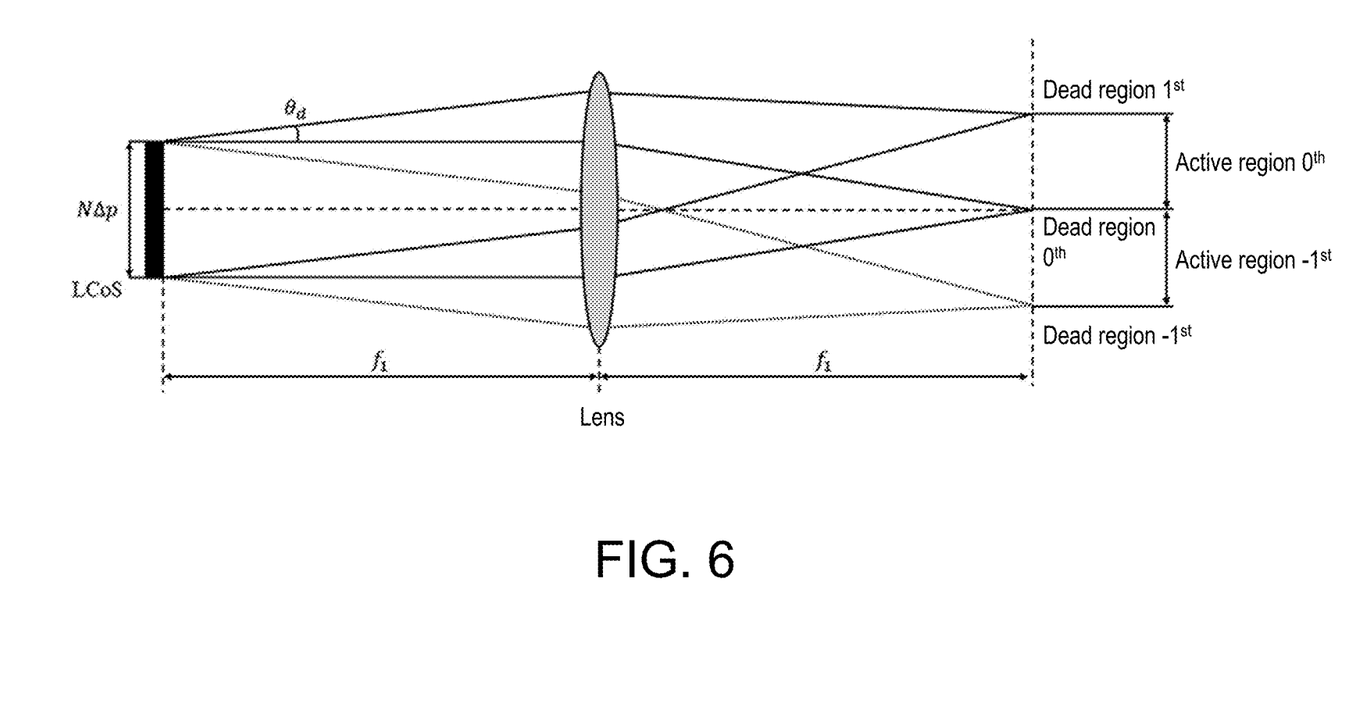
FIG. 6 is a structural view of the telecentric optical system when the phase hologram provided by an embodiment of the present disclosure is loaded with the two-dimensional digital blazed grating and the phase spatial light modulator is not inclined.

Therefore, the distance by which the active region diffracted light field moves along the frequency spectrum plane in the x-direction or the y-direction is $\Delta f_1/\Delta p$, that is, the frequency spectrum center of the active region diffracted light field will move to the midpoint of the frequency spectrum lattice of the dead region diffracted light field, thereby separating the active region diffracted light field from the dead region diffracted light field. FIG. 6 shows the distribution of the diffraction light field in the frequency spectrum plane after the phase spatial light modulator is loaded with the two-dimensional digital blazed grating.

Furthermore, although the two-dimensional digital blazed grating separates the frequency spectrum of the active region diffracted light field from the frequency spectrum of the dead region diffracted light field of the phase spatial light modulator, the separation changes the frequency spectrum distribution of the active region diffracted light field, so correction is required. As shown in FIG. 4, the phase spatial light modulator needs to be slightly inclined to shift the dead region zeroth-order diffracted light of the phase spatial light modulator to the optical axis, and make the frequency spectra of the dead region zeroth-order diffracted light and the dead region first-order diffracted light to be symmetrical with respect to the optical axis, wherein $\theta_s$ is the inclining angle of the phase spatial light modulator, and the inclining direction thereof is opposite to the moving direction of the frequency spectrum of the active region diffracted light field.

Figure 7:
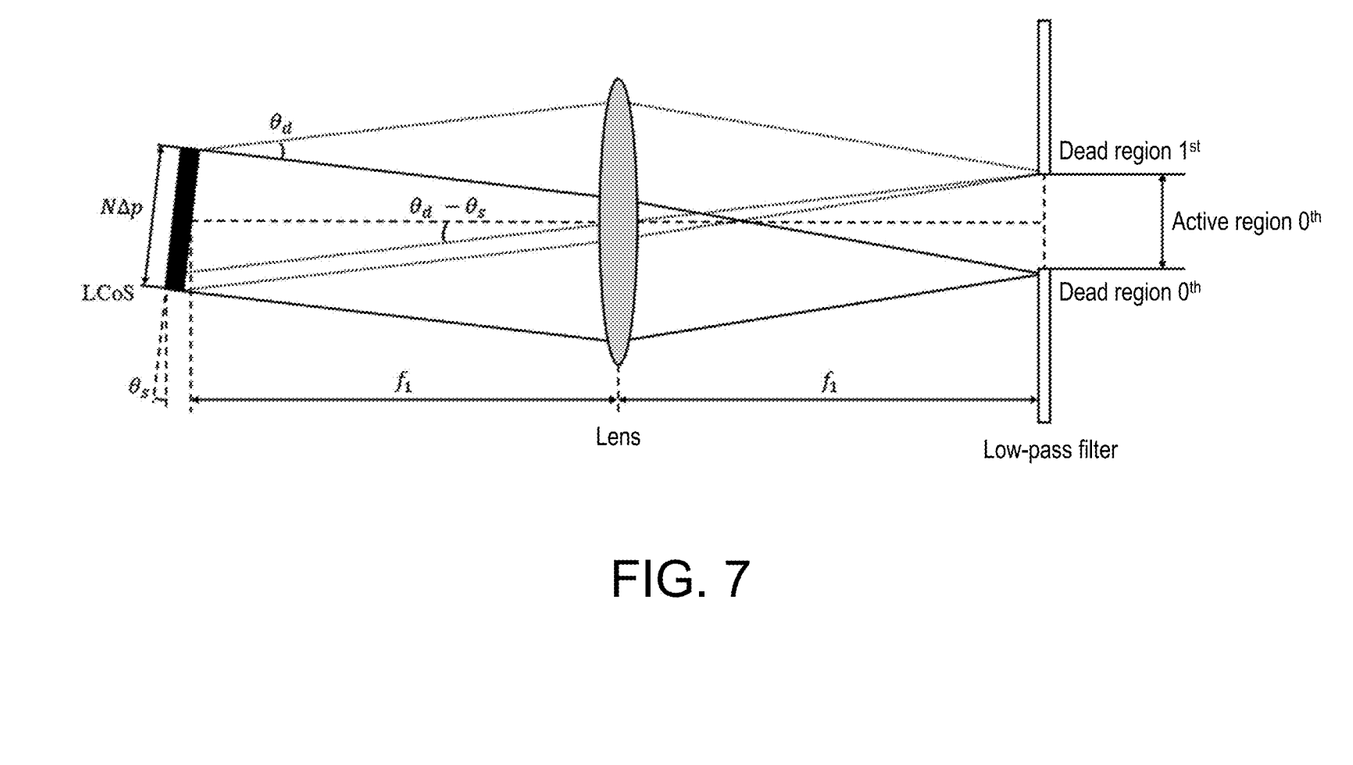
FIG. 7 is a structural view of the telecentric optical system when the phase hologram provided by an embodiment of the present disclosure is loaded with the two-dimensional digital blazed grating and the phase spatial light modulator is inclined.

As shown in FIG. 7, the center of the active region zeroth-order diffracted light $0^{th}$, the center of the dead region first-order diffracted light $1^{st}$ and the center of the lens form a right triangle, then:

$$\tan(\theta_d - \theta_s) = \frac{\lambda}{2\Delta p} = \frac{1}{2}\sin\theta_d.$$

From a small angle, $\tan\theta \approx \sin\theta$, that is:

$$\theta_d - \theta_s \approx \frac{1}{2}\theta_d.$$

Therefore, $$\theta_d = 2\theta_s.$$

Then the frequency spectrum of the recorded image is adjusted by using a square aperture on the focal plane of the telecentric lens system. The position and size of this aperture should be adjustable to suit the phase images loaded in different applications, but the size L of the aperture should satisfy $L \le f_1 \tan\theta_d$. Finally, the lens 2 is configured to perform optical Fourier inverse transform to obtain the object light wave required for printing.

It should be noted that the silicon-based liquid crystal spatial light modulator LCoS is used as an example in FIG. 5 to FIG. 7 to exemplify a phase spatial light modulator.

Therefore, by loading a two-dimensional digital blazed grating and an inclined phase spatial light modulator, and selecting an aperture of appropriate size, a diffracted light field of a phase spatial light modulator passes through a telecentric optical system, thus suppressing the high-order diffracted light in the dead region diffracted light field and the active region diffracted light field, and undergoes a 180° rotation and zooming at $f_2/f_1$.

Specifically:

(1) The zoom magnification of the telecentric imaging objective lens system is $$M = \left|-\frac{f_2}{f_1}\right|,$$

wherein M is between 0.05 to 20, $f_2$ is the focal length of the lens or a lens set 2, and the negative sign "-" indicates that the image passing through the telecentric imaging objective lens system is an inverted image;

(2) According to the size S of the hologram loaded by the phase spatial light modulator, the size of the holographic element during holographic printing is S'=MS, and the field of view of the holographic element is $$\theta_v = 2\sin^{-1}\left(\frac{0.5\lambda}{M\Delta p}\right);$$

Figure 8:
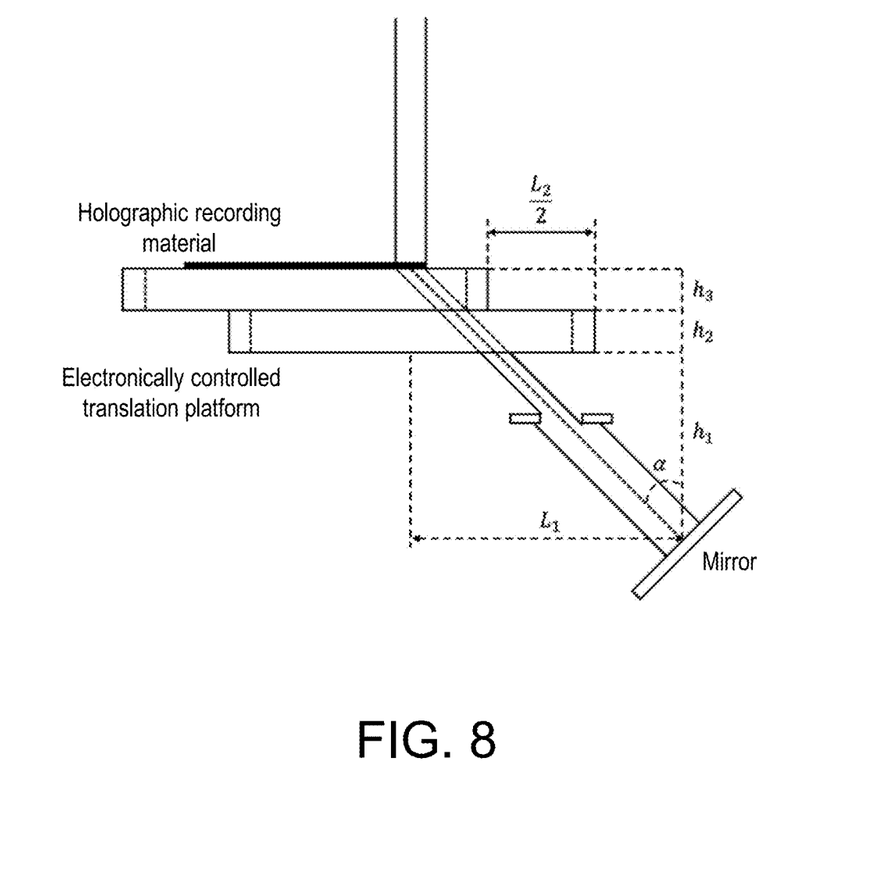
FIG. 8 is a schematic view of a square through hole design of an electronically controlled translation platform provided by an embodiment of the present disclosure.

(3) In order to prevent the loss of useful information about the object light, the diameter of the lens or the lens set 1 is set as $d_1 > 2f_1 \tan\theta_a + N\Delta p$;

(4) The phase spatial light modulator is located at the front focal plane of the telecentric imaging objective lens system, the holographic recording material is located at the back focal plane of the telecentric imaging objective lens system, and the back focal plane of the lens or the lens set 1 coincides with the front focal plane of the lens or the lens set 2, thus forming a frequency spectrum plane; the low-pass filter is located on the frequency spectrum plane;

(5) There is a square through hole in the center of the electronically controlled translation platform. As shown in FIG. 8, the side length of the square through hole satisfies the requirement that the electronically controlled translation platform does not block the reference light incident obliquely from the bottom in the process of printing holographic elements on the holographic recording materials in a tiled manner. That is to say, the side length of the square through hole is $L_m > 2L_1 + L_2 - 2(h_1+h_2)\tan\alpha + MN\Delta p$, wherein $L_1$ is the distance from the center of the mirror 3 to the central axis of the electronically controlled translation platform and the telecentric imaging objective lens system, $L_2$ is the side length of the holographic recording material, $h_1$ is the vertical distance from the center of the mirror 3 to the bottom of the electronically controlled translation platform, $h_2$ is the thickness of the bottom layer of the electronically controlled translation platform, and $\alpha$ is the incident angle of the reference light and is between 0° and 60°;

(6) The geometric centers of the phase spatial light modulator, the dichroic prism 2, the telecentric imaging objective lens system, the electronically controlled translation platform, and the CCD camera equipped with a telecentric lens are on the same straight line;

(7) The phase spatial light modulator is reflective and equipped with a semiconductor cooling system for controlling the temperature of the phase spatial light modulator;

(8) The holographic printing system is equipped with a filter 1 and a filter 2, so that the intensity of the object light and reference light during holographic printing is between 0.1-10 mW/cm², and the light intensity ratio is close to 1:1;

(9) The wavelength of the laser emitted by the laser is between 380 nm-800 nm, and the power W is between 1 and 1000 mW;

(10) The holographic recording material is silver halide latex, dichromate gelatin, photodegradable polymer material, photoconductive thermoplastic material, photorefractive material, photopolymerization material, photoisomerization material or metasurface material;

(11) The internal working region of the holographic printing system is isolated from external light, the internal structural parts are coated with an anti-reflective layer, and light traps are utilized to absorb excess laser light that is not involved in holographic printing.

Figure 9A:
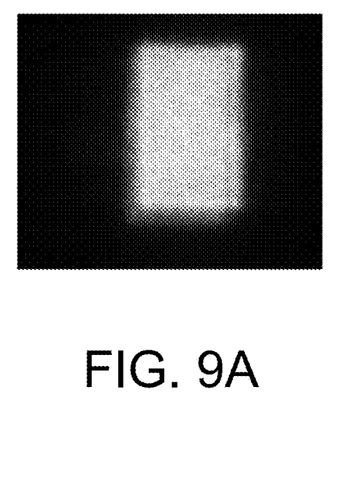
FIG. 9A and FIG. 9B are schematic views of a light spot of an object light and a light spot of a reference light on a holographic recording material displayed by a CCD industrial camera provided by an embodiment of the present disclosure.
Figure 9B:
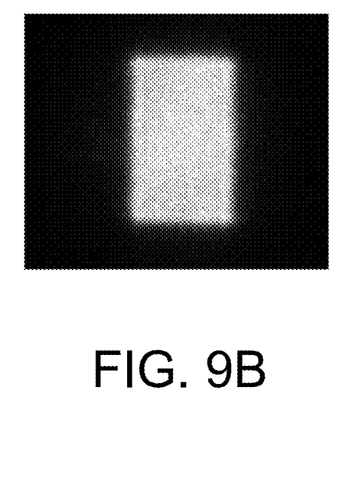

FIG. 9A and FIG. 9B show the light spots of the object light and the reference light on the holographic recording material displayed by the CCD camera before and after the size of the reference light is adjusted, respectively.

Figure 10A:
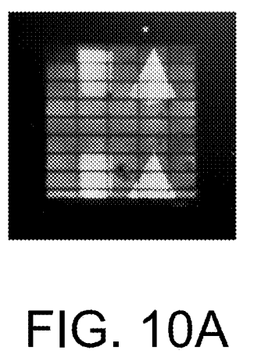
FIG. 10A to FIG. 10C are comparison charts of optical reproduction results of holograms printed by using a band-pass filter and the solution of the present disclosure provided by an embodiment of the present disclosure.
Figure 10B:
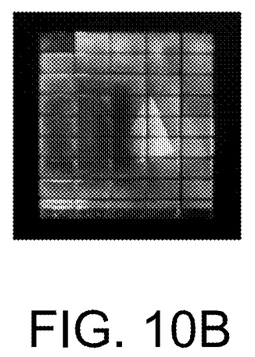
Figure 10C:
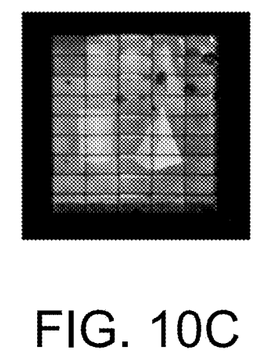

FIG. 10A shows the impact of the discrete characteristics of the pixelated structure of the phase spatial light modulator on the holographic wavefront printing results. In FIG. 10A, the telecentric imaging objective lens system with a band-pass filter is utilized to print the hologram, but the opening of the adopted band-pass filter is too large, which causes that the corresponding hologram reconstruction result is found to have a plurality of repeated images. FIG. 10B shows the optical reconstruction result of holograms printed using the telecentric imaging objective lens system corresponding to a band-pass filter with a suitable opening. As a result, black spots appear in the image, that is, useful information is lost. FIG. 10C shows the optical reconstruction result of the printed hologram according to an embodiment of the present disclosure. It is shown that the adverse effects of the discrete characteristics of the pixelated structure of the phase spatial light modulator on holographic wavefront printing are successfully eliminated.

It is easy for those skilled in the art to understand that the above descriptions are only preferred embodiments of the present disclosure and are not intended to limit the present disclosure. Any modifications, equivalent substitutions and improvements, etc., made within the spirit and principles of the present disclosure should all be included in the scope to be protected by the present disclosure.

What is claimed is:

1. A holographic wavefront printing system, comprising: a laser, a phase spatial light modulator, a first lens, a second lens, a low-pass filter and a holographic recording material;

wherein the laser is configured to generate a laser light, and the laser light is divided into two light beams, namely an object light and a reference light;

the phase spatial light modulator is configured to load a phase hologram, a pixel structure of the phase spatial light modulator comprises an active region and a dead region, the active region is configured to load the phase hologram to modulate a phase of an incident light, thereby generating an active region diffracted light containing information of the phase hologram, the dead region causes a constant phase shift of the incident light, producing a dead region diffracted light; a two-dimensional digital blazed grating is loaded on the phase hologram to adjust an emergent direction of the active region diffracted light, such that corresponding frequency spectra of the active region diffracted light and the dead region diffracted light after being subjected to an optical Fourier transform of a lens are prevented from overlapping with each other on a back focusing surface of the lens;

the object light is incident on the phase spatial light modulator and emits a corresponding diffracted light, the diffracted light comprises the active region diffracted light and the dead region diffracted light; the diffracted light is incident on the first lens and emitted onto a back focusing surface of the first lens after being subjected to an optical Fourier transform of the first lens, the phase spatial light modulator is inclined by a preset angle to change an emergent direction of the diffracted light, such that a dead region zeroth-order diffracted light frequency spectrum center and a dead region first-order diffracted light frequency spectrum center on a focusing surface are symmetrical with respect to a main optical axis of the first lens, and an active region zeroth-order diffracted light frequency spectrum center is adjusted to an original frequency spectrum center, the original frequency spectrum center refers to a position of the active region zeroth-order diffracted light frequency spectrum center on the back focusing surface of the first lens when the two-dimensional digital blazed grating is not loaded and the phase spatial light modulator is not inclined;

the low-pass filter is placed on the back focusing surface of the first lens, and configured to filter the dead region diffracted light and the active region high-order diffracted light, and only emits the active region zeroth-order diffracted light; the second lens is placed on an emergent direction of the low-pass filter, and configured to perform an optical Fourier inverse transform on the emitted active region zeroth-order diffracted light to obtain an object light containing effective information of the phase hologram; the object light containing the effective information of the phase hologram and the reference light are incident onto the holographic recording material, interference is generated in the holographic recording material, and a volume hologram is generated to complete a holographic wavefront printing process.

2. The holographic wavefront printing system according to claim 1, wherein the two-dimensional digital blazed grating is loaded on the phase hologram to adjust the emergent direction of the active region diffracted light, which is specifically performed as follows:

the two-dimensional digital blazed grating adjusts the emergent direction of the active region diffracted light, such that the corresponding frequency spectrum of the active region diffracted light after being subjected to the optical Fourier transform of the lens moves by $\Delta f_1/2\Delta p$ relatively; wherein $\lambda$ is a laser wavelength, $\Delta p$ is a pixel pitch of the phase spatial light modulator, and $f_1$ is a focal length of the first lens.

3. The holographic wavefront printing system according to claim 1, wherein the preset angle $\theta$, at which the phase spatial light modulator is inclined and a diffraction angle $\theta_d$ of the phase spatial light modulator satisfy the following relationship: $\theta_d=2\theta_s$; wherein $\theta_d$ is an angle between the dead region zeroth-order diffracted light and the dead region first-order diffracted light.

4. The holographic wavefront printing system according to claim 3, wherein the low-pass filter is a square aperture, and a side thereof is L; wherein $L \le f_1 \tan \theta_d$.

5. The holographic wavefront printing system according to claim 3, further comprising: an electronically controlled translation platform;

wherein the electronically controlled translation platform is configured to carry the holographic recording material;

when an area of the phase hologram to be loaded exceeds a threshold, the phase hologram is divided into a plurality of sub-phase holograms, each of the sub-phase holograms is loaded onto the phase spatial light modulator in turn, and combined with the electronically controlled translation platform to move the holographic recording material according to a region corresponding to each of the sub-phase holograms, such that the phase holograms are printed into various regions of the holographic recording material in batches and region by region to form a large hologram.

6. The holographic wavefront printing system according to claim 3, further comprising: a CCD camera;

wherein the CCD camera is equipped with a telecentric lens configured to observe whether a light spot of the object light containing the effective information of the phase hologram and a light spot of the reference light overlap each other on the holographic recording material, so as to assist in adjusting the light spots of the object light and the reference light to overlap each other.

7. The holographic wavefront printing system according to claim 1, wherein an inclining direction of the phase spatial light modulator is opposite to a moving direction of the active region diffracted light frequency spectrum after being loaded with the two-dimensional digital blazed grating.

8. A holographic wavefront printing method, comprising the following steps:

generating a laser light and dividing the laser light into two light beams, namely an object light and a reference light;

loading a phase hologram by using a phase spatial light modulator, wherein a pixel structure of the phase spatial light modulator comprises an active region and a dead region, the active region is configured to load the phase hologram to modulate a phase of an incident light, thereby generating an active region diffracted light containing information of the phase hologram, the dead region causes a constant phase shift of the incident light, producing a dead region diffracted light; a two-dimensional digital blazed grating is loaded on the phase hologram to adjust an emergent direction of the active region diffracted light, such that corresponding frequency spectra of the active region diffracted light and the dead region diffracted light after being subjected to an optical Fourier transform of a lens are prevented from overlapping with each other on a back focusing surface of the lens;

making the object light to be incident on the phase spatial light modulator and emitting a corresponding diffracted light from the phase spatial light modulator, wherein the diffracted light comprises the active region diffracted light and the dead region diffracted light;

making the diffracted light to be incident on a first lens and emitted onto a back focusing surface of the first lens after being subjected to an optical Fourier transform of the first lens, wherein the phase spatial light modulator is inclined by a preset angle to change an emergent direction of the diffracted light, such that a dead region zeroth-order diffracted light frequency spectrum center and a dead region first-order diffracted light frequency spectrum center on a focusing surface are symmetrical with respect to a main optical axis of the first lens, and an active region zeroth-order diffracted light frequency spectrum center is adjusted to an original frequency spectrum center, the original frequency spectrum center refers to a position of the active region zeroth-order diffracted light frequency spectrum center on the back focusing surface of the first lens when the two-dimensional digital blazed grating is not loaded and the phase spatial light modulator is not inclined;

placing a low-pass filter on the back focusing surface of the first lens, wherein the low-pass filter is configured to filter the dead region diffracted light and the active region high-order diffracted light, and only emit the active region zeroth-order diffracted light;

placing the second lens on an emergent direction of the low-pass filter, wherein the second lens is configured to perform an optical Fourier inverse transform on the emitted active region zeroth-order diffracted light to obtain an object light containing effective information of the phase hologram;

making the object light containing the effective information of the phase hologram and the reference light to be incident onto a holographic recording material, wherein interference is generated in the holographic recording material, and a volume hologram is generated to complete a holographic wavefront printing process.

9. The holographic wavefront printing method according to claim 8, wherein the two-dimensional digital blazed grating is loaded on the phase hologram to adjust the emergent direction of the active region diffracted light, which is specifically performed as follows:

adjusting the emergent direction of the active region diffracted light by using the two-dimensional digital blazed grating, such that the corresponding frequency spectrum of the active region diffracted light after being subjected to the optical Fourier transform of the lens moves by $\Delta f_1/2\Delta p$ relatively; wherein $\lambda$ is a laser wavelength, $\Delta p$ is a pixel pitch of the phase spatial light modulator, and $f_1$ is a focal length of the first lens.

10. The holographic wavefront printing method according to claim 8, wherein the preset angle $\theta_s$ at which the phase spatial light modulator is inclined and a diffraction angle $\theta_d$ of the phase spatial light modulator satisfy the following relationship: $\theta_d=2\theta_s$; wherein $\theta_d$ is an angle between the dead region zeroth-order diffracted light and the dead region first-order diffracted light.

* * * * *